(12) United States Patent
Bramlett et al.

(10) Patent No.: US 6,759,135 B2
(45) Date of Patent: Jul. 6, 2004

(54) EXTERIOR FINISHING SYSTEM AND BUILDING WALL STRUCTURE INCLUDING A BOND-COMPATIBLE COMPOSITE MEMBRANE AND METHOD OF CONSTRUCTING SAME

(75) Inventors: Tina L. Bramlett, Jacksonville, FL (US); William F. Egan, Ponte Vedra Beach, FL (US)

(73) Assignee: Construction Research & Technology GmbH, Trostberg (DE)

( * ) Notice: Subject to any disclaimer, the term of this patent is extended or adjusted under 35 U.S.C. 154(b) by 78 days.

(21) Appl. No.: 10/154,992

(22) Filed: May 24, 2002

(65) Prior Publication Data

US 2002/0182963 A1 Dec. 5, 2002

Related U.S. Application Data

(63) Continuation of application No. 09/372,701, filed on Aug. 11, 1999, now Pat. No. 6,395,401.

(51) Int. Cl.[7] ................................................ B32B 9/06
(52) U.S. Cl. ..................... 428/489; 428/490; 428/58; 52/203; 52/266
(58) Field of Search ................................ 428/228, 247, 428/183, 489, 490, 184, 182, 59, 57, 285, 480, 430; 52/202, 268, 409, 203, 266, 292.2

(56) References Cited

U.S. PATENT DOCUMENTS

| | | |
|---|---|---|
| 3,466,827 A | 9/1969 | Clem |
| 3,780,482 A | 12/1973 | De Lange |
| 4,103,061 A | 7/1978 | Chomes |
| 4,610,902 A | 9/1986 | Eastman et al. |
| 4,680,907 A | 7/1987 | Williams |
| 4,897,293 A | 1/1990 | Thessen |
| 4,935,281 A | 6/1990 | Tolbert et al. |
| 5,027,572 A | 7/1991 | Purcell et al. |
| 5,220,762 A | 6/1993 | Lehnert et al. |
| 5,318,832 A | 6/1994 | Fishel et al. |
| 5,456,785 A | 10/1995 | Venable |
| 5,481,838 A | 1/1996 | Fishel et al. |
| 5,687,517 A | 11/1997 | Wiercinski et al. |

OTHER PUBLICATIONS

Polyguard Products, Inc., *Material Safety Data Sheet*, Polyguard TILEGUARD, Nov. 6, 1998, pp. 1–2.

James Ladouceur, Chemist; *Polyguard Testing*, Jan. 5, 1999, pp. 1–25.

*Primary Examiner*—Merrick Dixon
(74) *Attorney, Agent, or Firm*—Renner, Kenner Greive, Bobak, Taylor & Weber

(57) ABSTRACT

The invention is directed to a bond-compatible composite membrane comprising a first self-adhesive material layer and a second rough fabric layer, and its use as an intermediate layer between a building structure substrate and exterior finishing materials. Unlike conventional composite membranes, the bond-compatible composite membrane has a rough surface that allows bonding materials to adhere to it. Therefore, mechanical devices are not needed to attach the exterior finishing materials to the building structure.

43 Claims, 2 Drawing Sheets

US 6,759,135 B2

EXTERIOR FINISHING SYSTEM AND BUILDING WALL STRUCTURE INCLUDING A BOND-COMPATIBLE COMPOSITE MEMBRANE AND METHOD OF CONSTRUCTING SAME

CROSS REFERENCE TO RELATED APPLICATIONS

The present application is a continuation of U.S. Ser. No. 09/372,701 now U.S. Pat. No. 6,395,401B1, filed Aug. 11, 1999.

BACKGROUND OF THE INVENTION

1. Field of the Invention

The invention is directed to composite membranes and their use as flashing around window frames, door frames, structural joints and other highly exposed surfaces of building frames or like structures prior to the application of exterior finishing materials, and their use as intermediate layers in the application of exterior finishing materials to building structures.

2. Discussion of Related Art

Composite membranes are commonly used in the construction industry for protecting and waterproofing the frame structure of building frames and roofs. The exposure of a building frame or roofs to environmental factors such as water and moisture can result in devastating damage to the structure. Therefore, it is important for the composite membrane to bond tightly with the structure so environmental factors, such as water and moisture, are not allowed to contact and ultimately harm the structure. Composite membranes are applied to substrates such as a roof, wood framing, steel framing and plywood sheathing, gypsum sheathing and cement board sheathing before any exterior finishing materials are mounted on the substrates. The membranes are formed of materials such as polyethylene and rubberized bitumen or asphalt. Although they adhere well to substrates, these membranes have slick surfaces that are not compatible with conventional bonding materials such as adhesives and base coats normally used to adhere exterior finishing materials such as weather barriers and insulation, to the substrate. As a result, the exterior finishing materials must be mounted onto the composite membrane with mechanical devices such as screws and nails. Although the mechanical devices may effectively secure the exterior finishing materials to the composite membrane as well as the substrate, the mechanical devices must penetrate and perforate the composite membrane creating potential weak points in the membrane where damaging water and moisture may enter. The lack of tight adhesion between the composite membrane and the exterior finishing materials reduces the stability and wind load capacity of the structure.

OBJECTS AND SUMMARY OF THE INVENTION

In light of the problems with conventional composite membranes commonly used in waterproofing systems, it is an object of the present invention to provide a composite membrane that has a rough surface that will bond with materials such as adhesives and base coats.

It is another object of the present invention to provide a method of adhering exterior finishing materials to highly exposed exterior portions of a building structure by utilizing a composite membrane as an intermediate layer between the structure and exterior finishing materials without the use of mechanical devices such as nails and screws.

It is another object of the invention to provide a composite membrane capable of forming a bond with a tensile strength sufficient to withstand design wind loads required of a specific project which may be in excess of 70 PSF.

In accordance with these objectives, the present invention provides a composite membrane having a rough surface that is compatible with bonding materials. This bond-compatible composite membrane comprises a bituminous material layer and a polyester fabric layer. The bond-compatible composite membrane is utilized in a method of waterproofing wood framing, metal framing, plywood, sheathing gypsum, cement board and other highly exposed exterior portions of a structure by adhering the bituminous material layer to the structure and bonding exterior finishing materials such as weather barrier, insulation, exterior cladding and exterior insulation and finishing systems (EIFS) to the polyester fabric layer. The adhesive strength of the bond formed between the polyester fabric layer and the exterior finishing materials is sufficient to hold the exterior finishing materials on the substrate without mechanical devices that will perforate the composite membrane.

DETAILED DESCRIPTION OF THE INVENTION

1. Overview of the Invention

Figure 1:
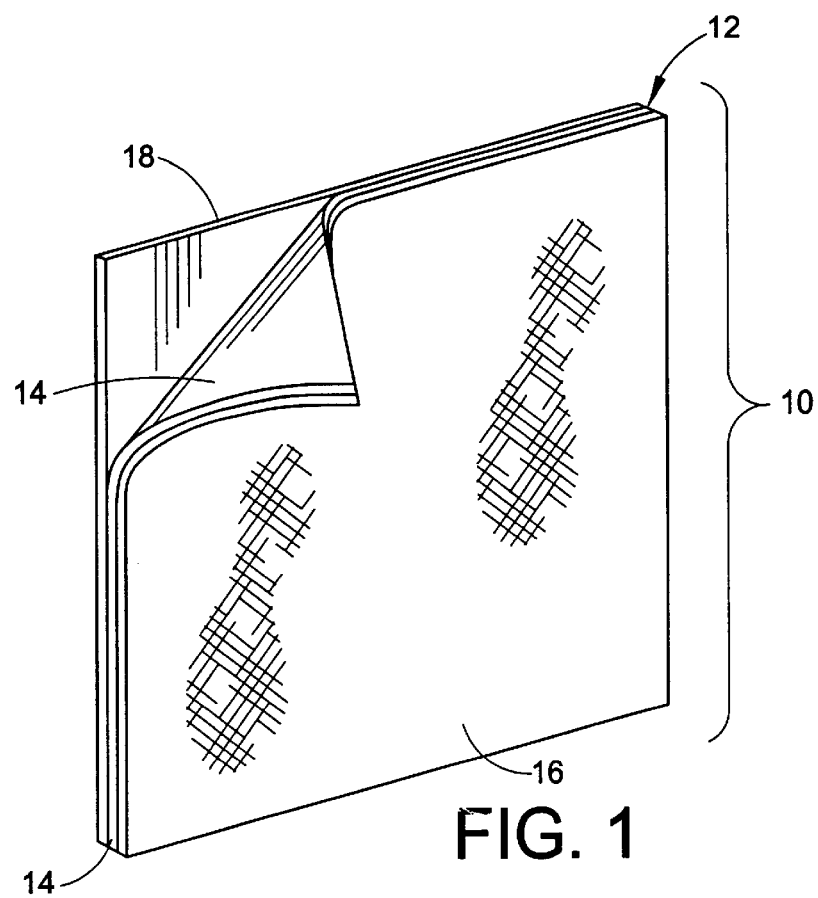
FIG. 1 is a partial cross sectional view of a bond-compatible composite membrane adhered to release paper.
Figure 2:
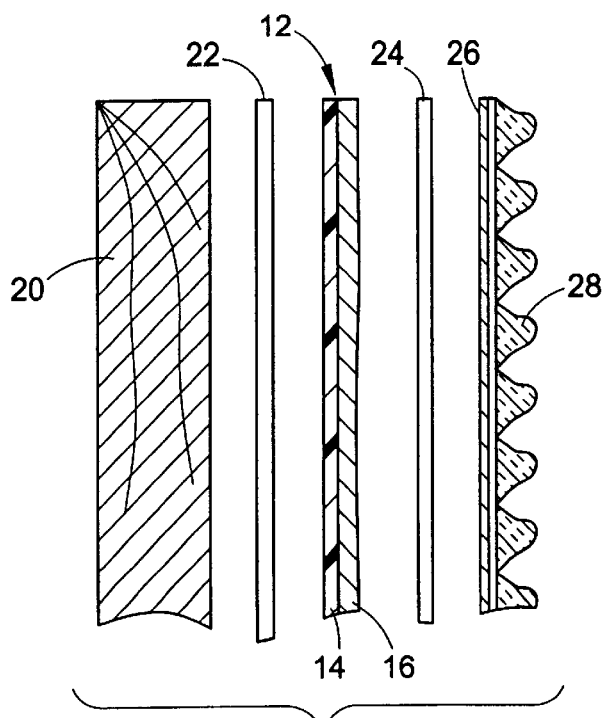
FIG. 2 is a cross sectional diagram of a bond-compatible composite membrane positioned between a substrate and a weather barrier.

Referring now to FIGS. 1 and 2, the invention relates to a bond-compatible composite membrane 12 comprising a bituminous material layer 14 and a polyester fabric layer 16. The bituminous material layer 14 of the bond-compatible composite membrane 12 protects substrate 20 from damaging environmental factors such as moisture. Substrate 20 may be wood framing, metal framing, plywood sheathing, gypsum board, cement or other structural materials. The polyester fabric layer 16 of the composite membrane 12 has a rough surface that is compatible with, i.e. forms a bond with, bonding materials 24. The bonding materials are used to secure exterior finishing materials 26 to the composite membrane 12. The dual function of the single bond-compatible composite membrane 12 allows it to act as both an effective protective layer and an excellent bonding surface for adhesives, base coats and other bonding materials 24, thereby eliminating the need to secure the exterior finishing materials 26 to the substrate 20 with mechanical devices that weaken the protective properties of the bituminous material.

2. The Bond-Compatible Composite Membrane

Referring again to FIG. 1, the bond-compatible composite membrane 12 is manufactured as a membrane sheet 10. The membrane sheet 10 comprises a bond-compatible composite membrane 12 and release paper 18. The bond-compatible composite membrane 12 is formed of two layers, a bituminous material layer 14 and a polyester fabric layer 16. Preferably, the bituminous layer 14 comprises between approximately 90%–99% by total weight of the composite membrane 12. The polyester fabric layer 16 comprises between approximately 1%–10% by weight of the composite membrane 12, but preferably 8% by total weight of the composite membrane 12. In addition, the polyester fabric layer 16 is preferably a non-woven, mesh fabric.

The bituminous material layer 14 comprises rubberized asphalt or bitumen and optionally, a polymer such as styrene-butadiene, and calcium carbonate. Preferably, the bituminous material layer 14 comprises, between approximately 67%–74% bitumen, between approximately 0%–15% styrene-butadiene, and between approximately 0%–15% calcium carbonate, by total weight of the composite membrane 12.

The membrane sheet 10 is manufactured by a reverse roll coating process (not pictured). Bituminous material is heated to a temperature of approximately 260° F. The hot liquid bituminous material is then poured onto release paper 18 forming the bituminous material layer 14 of the composite membrane 12. Non-woven polyester fabric is placed on the bituminous material layer 14. The non-woven polyester fabric forms the polyester fabric layer 16 of the composite membrane 12. The release paper 18, bituminous material, and polyester fabric are rolled through rollers filled with cold water to press to the polyester fabric into the bituminous material and solidify the resulting composite membrane 12.

The bond-compatible composite membrane 12 is between approximately 35 and 45 mils (1/1000") thick, and preferably approximately 40 mils thick. The membrane sheet 10 is wound into rolls and distributed for use in conjunction with the application of exterior finishing materials and systems.

3. Method of Adhering Exterior Finishing Materials to a Bond-Compatible Composite Membrane Referring now to FIGS. 2, 3 and 4, the composite membrane 12 serves as an intermediate layer in the application of exterior finishing materials 26 to substrates 20. Exterior finishing materials 26 are securely adhered to the exterior of a structure through the following procedure. Substrate 20 is primed with a primer 22 that is compatible with bituminous materials. However, if the substrate 20 is steel framing or other non-porous materials, the primer 22 is not necessary. A membrane sheet 10 is then provided and the release paper 18 is removed to expose the bituminous material layer 14 of the composite membrane 12. The bituminous material layer 14 is then adhered to the primer coated substrate 20 to form a tight protective bond.

Figure 3:
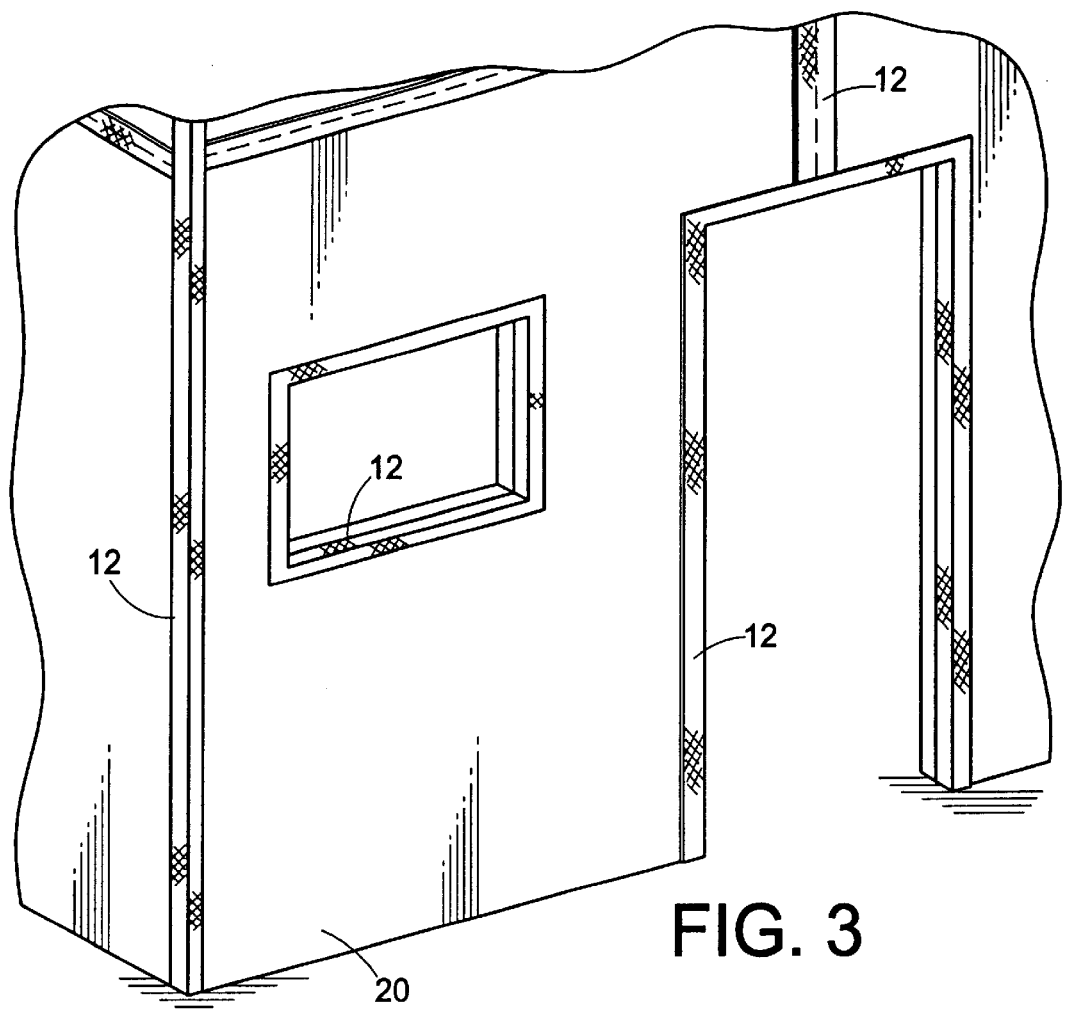
FIG. 3 is an illustration of the bond-compatible composite membrane mounted on highly exposed portions of a framed structure such as the door frame, window frame and exterior joints, prior to the application of a weather barrier or other exterior surfacing materials.

As depicted in FIG. 3, the composite membrane 12 is preferably applied around highly exposed exterior surfaces of building such as door frames, window frames and construction joints that are particularly susceptible to environmental damage.

Following the application of the bituminous material layer 14 to the primer 22 (if used) that was applied to the substrate 20, bonding material 24 is applied to the polyester fabric layer 16 of the composite membrane 12. Acceptable bonding materials 24 are adhesives, base coats such as cementitious compositions and acrylic compositions, and other materials that form a bond.

Exterior finishing materials 26 such as weather barriers, insulation, exterior cladding and exterior insulation and finishing systems (EIFS) are mounted on the polyester fabric layer 16 of the composite layer 12 with the bonding material 24 applied to the polyester fabric layer 16. The quality of the bond is determined by the tensile strength of the bond. Higher tensile strengths indicate stronger bonds. Bonding materials 24 preferred for use in conjunction with the composite membrane 12 have tensile strengths of at least 7.5 psi at room temperature, 7.0 psi at 120° F., and 3.7 psi at 0° F.

The preferred bonding materials 24 for use with the composite membrane 12 are NC II Base Coat, Standard Basecoat, Senerquick Adhesive and Alpha Dry Basecoat. The tensile strength of bonds formed between the composite membrane 12 and these preferred bonding materials 24 were measured. The results of these measurements are set forth in Table 1 below.

TABLE 1

| Average Tensile Strength in psi | NCII Base Coat | Standard Basecoat | Senerquick Adhesive | Alpha Dry Basecoat |
| --- | --- | --- | --- | --- |
| @ Room Temperature (approximately 70° F.) | 18.0–22.0 (20.0 +/− 2.0) | 19.0–25.0 (22.0 +/− 3.0) | 7.5–9.1 (8.3 +/− 0.8) | 19.3–20.9 (20.1 +/− 0.8) |
| @ 120° F. | 18.0–22.0 (20.0 +/− 2.0) | 17.0–21.0 (19.0 +/− 2.0) | 7.0–11.0 (9.0 +/− 2.0) | 15.0–21.0 (18.0 +/− 3.0) |
| @ 0° F. | 17.0–19.0 (18.0 +/− 1.0) | 17.0–23.0 (20.0 +/− 3.0) | 3.7–4.9 (4.3 +/− 0.6) | 18.0–22.0 (20.0 +/− 2.0) |

The composition of the preferred bonding materials is set forth in Table II below.

TABLE II

| Bonding Material | Weight % of Components | |
| --- | --- | --- |
| NCII Base Coat | Kaolin | 1.0–2.0% |
| | Water | 1.5–20.0% |
| | Acrylic Polymer | 10.0–15.0% |
| | Crystalline silica | 55.0–65.0% |
| | Feldspar | 1.0–5.0% |
| | Mica | 1.0–5.0% |
| Standard Basecoat | Crystalline silica | 45.0–70.0% |
| | Acrylic Polymer | 5.0–30.0% |
| | Talc | 0.0–15.0% |
| | Water | Balance |
| Senerquick Adhesive | Acrylic Polymer | 15.0–20.0% |
| | Water | 35.0–40.0% |
| | Calcium Carbonate | 40.0–45.0% |
| Alpha Dry Basecoat | Silica, crystalline quartz | 40.0–55.0% |
| | Portland Cement | 35.0–45.0% |
| | Calcium Carbonate | 2.0–5.0% |
| | Fly Ash | 1.0–3.0% |
| | Polymer | Balance |

The tensile strength of the bond is also indicative of the wind load strength of the bond. Consequentially, the high tensile strength of the bonds between the polyester fabric layer 16 and the bonding material 24 translates into higher wind resistance.

Figure 4:
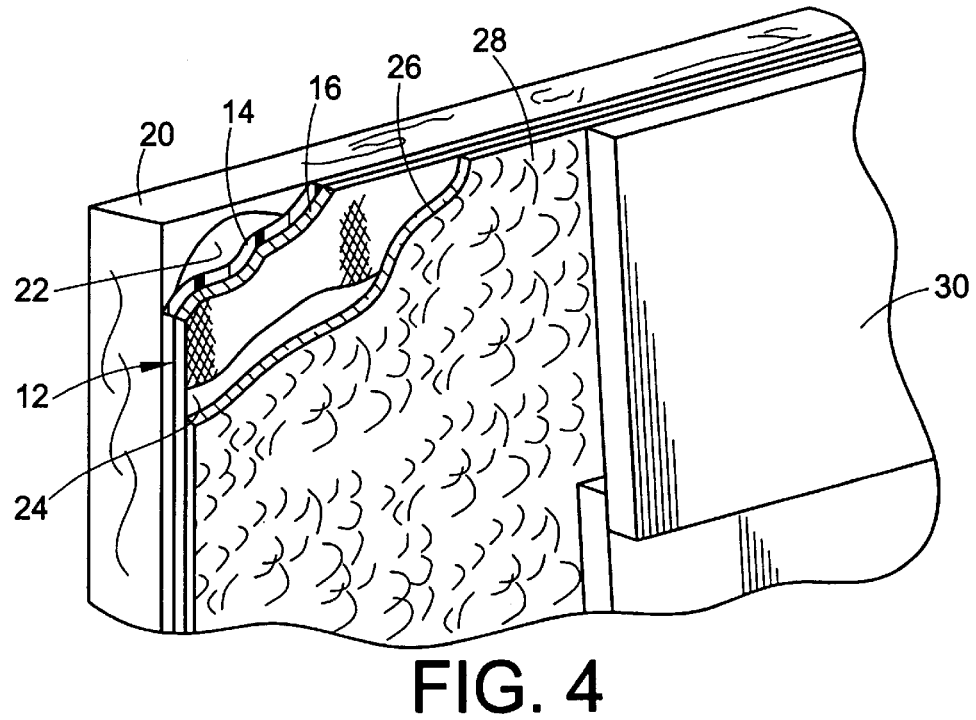
FIG. 4 is a partial cross sectional diagram of a finished exterior wall depicting the bond-compatible composite membrane adhered to a substrate, insulation material adhered to the bond-compatible composite membrane and exterior cladding mounted over the insulation.

The tensile strength of adhesive bonds formed with the preferred bonding materials 24 listed above are sufficient to support several layers of exterior finishing materials 26, or exterior finishing systems formed of multiple layers of materials such as insulation 28 and exterior cladding 30 as depicted in FIG. 4.

Many changes and modifications may also be made to the invention without departing from the spirit thereof. The scope of the changes will become apparent from the appended claims.

We claim:

1. A building wall comprising:
   a substrate comprising or attached to a frame; and
   a bond-compatible composite membrane adhered to said substrate, said membrane comprising a first self-adhesive material layer and a second rough fabric layer, wherein said first self-adhesive material layer is adhered to said substrate, and wherein said second rough fabric layer provides a bonding surface for forming a bond with a bonding material.
2. The building wall of claim 1, wherein said substrate is selected from the group consisting of wood framing, metal framing, plywood sheathing, gypsum board and cement board.
3. The building wall of claim 1, wherein said first self-adhesive material layer is a self-adhesive bituminous material layer.
4. The building wall of claim 3, wherein said first self-adhesive bituminous material layer is a rubberized, self-adhesive bituminous material layer.
5. The building wall of claim 1, wherein said second rough fabric layer is a polyester fabric layer.
6. The building wall of claim 1, wherein said polyester fabric layer is non-woven.
7. The building wall of claim 1, wherein said first self-adhesive material layer is a self-adhesive bituminous material layer and wherein said second rough fabric layer is a polyester fabric layer.
8. The building wall of claim 7, wherein said first self-adhesive bituminous material layer comprises from about 90 to about 99 weight percent, by total weight of the composite membrane, and wherein said second polyester fabric layer comprises from about 1 to about 10 weight percent, by total weight of the composite membrane.
9. The building wall of claim 7, wherein said first self-adhesive bituminous material layer comprises bitumen, styrene-butadiene copolymer and calcium carbonate.
10. The building wall of claim 7, wherein said composite membrane is from about 35 to about 45 mils thick.
11. The building wall of claim 7, wherein said composite membrane is about 40 mils thick.
12. The building wall of claim 7, further comprising a bonding material disposed on said second rough fabric layer.
13. The building wall of claim 12, wherein said bonding material is selected from the group consisting of adhesives, base coats, cementitious materials and acrylic compositions.
14. The building wall of claim 12, further comprising exterior finishing materials bonded to said composite membrane by a bond formed with said bonding material.
15. The building wall of claim 14, wherein said bond between said composite membrane and said exterior finishing material has a tensile strength of at least about 7.5 psi at room temperature, at least about 7 at 120° F., and at least about 3.7 psi at 0° F.
16. The building wall of claim 15, wherein the tensile strength of said bond is between about 18 to about 22 psi at room temperature, about 18 to about 22 at 120° F., and about 17 to about 19 psi at 0° F.
17. The building wall of claim 15, wherein the tensile strength of said bond is between about 19 to about 25 psi at room temperature, about 17 to about 23 at 120° F., and about 17 to about 23 psi at 0° F.
18. The building wall of claim 15, wherein the tensile strength of said bond is between about 7.5 to about 9.1 psi at room temperature, about 7 to about 11 at 120° F., and about 3.7 to about 4.9 psi at 0° F.
19. The building wall of claim 15, wherein the tensile strength of said bond is between about 19.3 to about 20.9 psi at room temperature, about 15 to about 21 at 120° F., and about 18 to about 22 psi at 0° F.
20. The building wall of claim 14, wherein said exterior finishing material is selected from the group consisting of a weather barrier, insulation, exterior cladding and an exterior insulation and finish system.
21. The building wall of claim 20, wherein said exterior finishing material is an exterior insulation and finish system.
22. A method for constructing a building wall containing a frame comprising:
   optionally attaching a substrate to said frame;
   providing a bond-compatible composite membrane comprising a first self-adhesive material layer and a second rough fabric layer, wherein said second rough fabric layer provides a bonding surface for forming a bond with a bonding material; and
   adhering said first self-adhesive layer of said bond-compatible composite membrane to said frame or said substrate.
23. The method of claim 22, wherein said first self-adhesive material layer is a self-adhesive bituminous material layer.
24. The method of claim 23, wherein said first self-adhesive bituminous material layer is a rubberized, self-adhesive bituminous material layer.
25. The method of claim 22, wherein said second rough fabric layer is a polyester fabric layer.
26. The method of claim 22, wherein said polyester fabric layer is non-woven.
27. The method of claim 22, wherein said first self-adhesive material layer is a self-adhesive bituminous material layer and wherein said second rough fabric layer is a polyester fabric layer.
28. The method of claim 27, wherein said first self-adhesive bituminous material layer comprises from about 90 to about 99 weight percent, by total weight of the composite membrane, and wherein said second polyester fabric layer comprises from about 1 to about 10 weight percent, by total weight of the composite membrane.
29. The method of claim 27, wherein said first self-adhesive bituminous material layer comprises bitumen, styrene-butadiene copolymer and calcium carbonate.
30. The method of claim 27, wherein said composite membrane is from about 35 to about 45 mils thick.
31. The method of claim 27, wherein said composite membrane is about 40 mils thick.
32. The method of claim 22, further comprising applying a bonding material to said second rough fabric layer and bonding said exterior finishing materials to said composite membrane with said bonding material.
33. The method of claim 27, further comprising applying a bonding material to said polyester fabric layer and bonding said exterior finishing materials to said composite membrane with said bonding material.
34. The method of claim 33, wherein said first self-adhesive bituminous material layer comprises from about 90 to about 99 weight percent, by total weight of the composite membrane, and wherein said second polyester fabric layer comprises from about 1 to about 10 weight percent, by total weight of the composite membrane.

35. The method of claim 33, wherein said first self-adhesive bituminous material layer comprises bitumen, styrene-butadiene copolymer and calcium carbonate.

36. The method of claim 33, wherein said composite membrane is from about 35 to about 45 mils thick.

37. The method of claim 33, wherein said bond between said composite membrane and said exterior finishing material has a tensile strength of at least about 7.5 psi at room temperature, at least about 7 at 120° F., and at least about 3.7 psi at 0° F.

38. The method of claim 37, wherein the tensile strength of said bond is between about 18 to about 22 psi at room temperature, about 18 to about 22 at 120° F., and about 17 to about 19 psi at 0° F.

39. The method of claim 37, wherein the tensile strength of said bond is between about 19 to about 25 psi at room temperature, about 17 to about 23 at 120° F., and about 17 to about 23 psi at 0° F.

40. The method of claim 37, wherein the tensile strength of said bond is between about 7.5 to about 9.1 psi at room temperature, about 7 to about 11 at 120° F., and about 3.7 to about 4.9 psi at 0° F.

41. The method of claim 37, wherein the tensile strength of said bond is between about 19.3 to about 20.9 psi at room temperature, about 15 to about 21 at 120° F., and about 18 to about 22 psi at 0° F.

42. The method of claim 33, wherein said exterior finishing material is selected from the group consisting of a weather barrier, insulation, exterior cladding and an exterior insulation and finish system.

43. The method of claim 42, wherein said exterior finishing material is an exterior insulation and finish system.

* * * * *